United States Patent [19]
Ames et al.

[11] Patent Number: 5,410,732
[45] Date of Patent: Apr. 25, 1995

[54] METHOD AND APPARATUS FOR DECENTRALIZING UPLINK NETWORK CONTROL FUNCTIONS AND MINIMIZING TERMINAL POWER LEVEL ASSESSMENT OVERHEAD IN RADIO FREQUENCY DATA COMMUNICATIONS NETWORKS

[75] Inventors: Richard N. Ames, Boca Raton; Victor S. Moore, Delray Beach, both of Fla.

[73] Assignee: International Business Machines Corp., Armonk, N.Y.

[21] Appl. No.: 109,410

[22] Filed: Aug. 19, 1993

Related U.S. Application Data

[63] Continuation of Ser. No. 747,216, Aug. 19, 1991, abandoned.

[51] Int. Cl.⁶ .............................................. H04Q 7/00
[52] U.S. Cl. ................................. 455/33.1; 455/34.1; 455/56.1; 370/94.1; 370/95.1
[58] Field of Search ................... 455/33.1, 33.2, 33.4, 455/34.1, 34.2, 53.1, 54.1, 54.2, 56.1, 57.1, 62, 67.1, 67.3, 73, 89; 375/59–60; 370/95.1, 95.3, 94.1

[56] References Cited

U.S. PATENT DOCUMENTS

| | | | |
|---|---|---|---|
| 4,144,412 | 3/1979 | Ito et al. | 179/2 |
| 4,144,496 | 3/1979 | Cunningham et al. | 325/53 |
| 4,352,201 | 9/1982 | Miller | 455/56.1 |
| 4,512,033 | 4/1985 | Schrock | 455/2 |
| 4,519,068 | 5/1985 | Krebs et al. | 455/56.1 |
| 4,550,443 | 10/1985 | Freeburg | 455/33.3 |
| 4,613,990 | 9/1986 | Halpern | 455/33 |
| 4,670,899 | 6/1987 | Brody et al. | 379/60 |
| 4,736,453 | 4/1988 | Schloemer | 455/33 |
| 4,775,995 | 10/1988 | Chapman et al. | 455/54.1 |
| 4,783,780 | 11/1988 | Alexis | 455/33.1 |
| 4,790,000 | 12/1988 | Kinoshita | 379/59 |
| 4,792,984 | 12/1988 | Matsuo | 455/34.2 |
| 4,850,032 | 7/1989 | Freeburg | 455/51.2 |
| 4,866,788 | 9/1989 | Mouly et al. | 455/9 |
| 4,901,307 | 2/1990 | Gilhousen et al. | 370/18 |
| 4,905,301 | 2/1990 | Krolopp et al. | 455/34.1 |
| 4,907,290 | 3/1990 | Crompton | 455/56 |
| 4,914,651 | 4/1990 | Lusignan | 370/69.1 |
| 4,918,746 | 4/1990 | Serizawa | 455/56.1 |
| 4,932,043 | 6/1990 | Lee | 379/60 |
| 4,992,753 | 2/1991 | Jenson et al. | 330/129 |
| 5,014,314 | 5/1991 | Mulford et al. | 455/33.1 |
| 5,029,334 | 7/1991 | Braun et al. | 379/60 |
| 5,060,296 | 10/1991 | Grube et al. | 455/33.1 |
| 5,128,959 | 7/1992 | Bruckert | 455/33.2 |
| 5,142,695 | 8/1992 | Roberts et al. | 379/60 |

*Primary Examiner*—Reinhard J. Eisenzopf
*Assistant Examiner*—Andrew Faile
*Attorney, Agent, or Firm*—George E. Grosser

[57] ABSTRACT

Methods and apparatus are set forth which enable a radio frequency data communications network (1) to perform decentralized uplink network control functions (decentralized away from the centralized general communications controller (GCC) level of the network hierarchy); (2) to minimize, or in some cases eliminate, the overhead expended in making power lever (signal strength) determinations and assessments at both the GCC and base station levels of the network hierarchy (for the purpose of managing uplink communications); and (3) to allow individual subscriber radios (terminals) to dynamically determine the most desirable base station to communicate with when exchanging information a host computer via a shared RF communication channel (the link between a terminal and the base station). Additionally, an illustrative radio frequency data communication network, built in accordance with the teachings of the invention as a modified version of an existing network, is described where the modified network incorporates the aforementioned methods and apparatus.

55 Claims, 3 Drawing Sheets

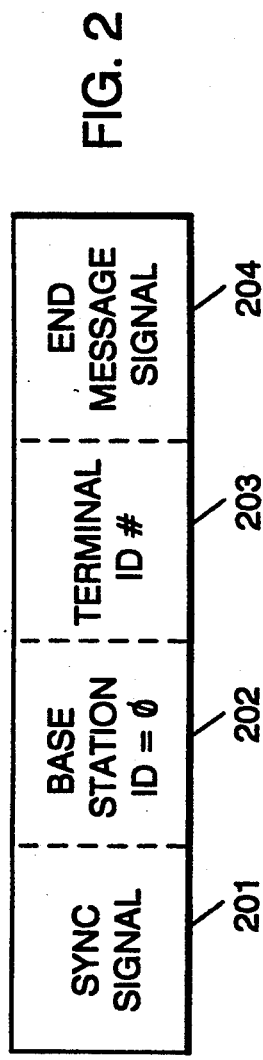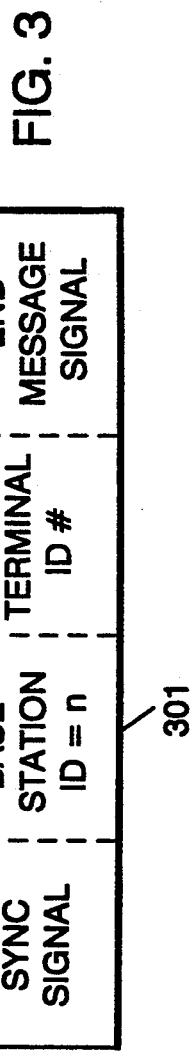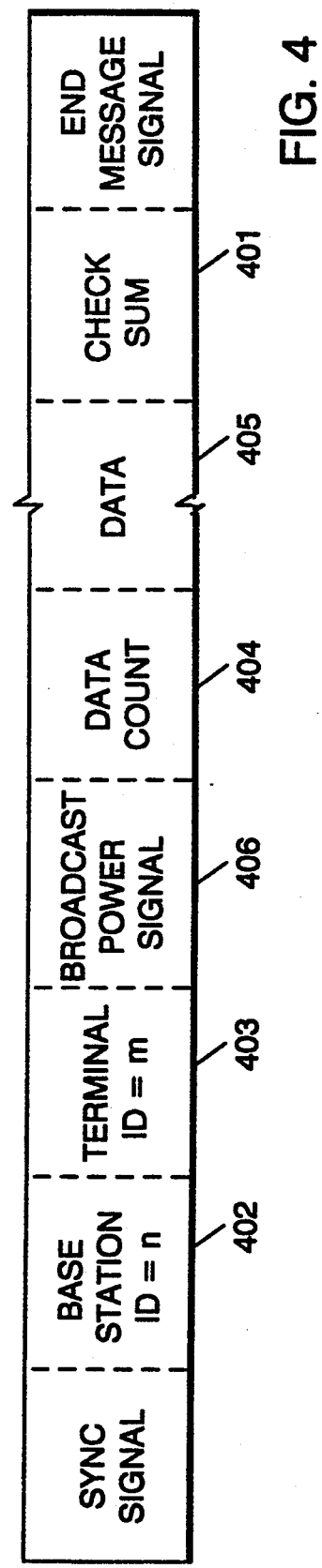

METHOD AND APPARATUS FOR DECENTRALIZING UPLINK NETWORK CONTROL FUNCTIONS AND MINIMIZING TERMINAL POWER LEVEL ASSESSMENT OVERHEAD IN RADIO FREQUENCY DATA COMMUNICATIONS NETWORKS

This is a continuation of Ser. No. 07/747,216, filed on Aug. 19, 1991, now abandoned.

BACKGROUND OF THE INVENTION

1. Field of the Invention

The invention relates generally to cellular networks used for performing digital communications over a large geographical area via radio frequency ("RF") links sharing a single assigned channel or frequency. More particularly, the invention relates to methods and apparatus which (1) facilitate decentralizing certain uplink network message control functions and (2) minimizing, or in some cases eliminating, terminal power level assessment overhead typically expended by base stations and network controllers to reliably perform digital communications on RF links using the aforementioned single assigned frequency or channel.

2. Description of the Related Art

Cellular radiotelephone networks are well known that provide communications services over a predefined geographical area divided into zones which are sometimes referred to as "cells". Each cell typically includes a plurality of base stations and associated antennas located at each base station, for transmitting and receiving message signals between a given base station and subscriber radios, sometimes referred to as "terminals", "cellular phones", "radiotelephones", "data radios", and the like, located in or transiting through a given cell.

Each base station in a given cell typically communicates with a general communications controller (a "GCC"), which functions as a centralized control mechanism for coordinating communications between the subscriber radios in a given cell and a host computer, often coupled to or forming part of a telephone switching network.

An example of such a system in commercial use is the Advanced Radio Digital Information System ("ARDIS"), developed jointly by Motorola, Inc. and the International Business Machines Corporation. A specific example of such a system is described in U.S. Pat. Nos. 4,550,443 and 4,850,032, to Freeburg, and in many other technical publications and patents.

In the ARDIS, RF links between the various terminals in a given cell and the base stations within that cell, are dynamically established as the need for communications services and resources arise.

Many of the aforesaid technical publications and patents have addressed the problem of how to support a multiplicity of simultaneous digital communications randomly attempting to make use of the single frequency (also referred to herein as the shared channel) that is usually assigned for a predefined geographical area. This is the case, for example, in U.S. Pat. No. 4,866,788, to Mouly et al, which describes a process for controlling the retransmission of messages from transmitting stations belonging to a cellular system.

The process taught by Mouly et al is based on the recognition that the probability of having to retransmit a request message to use a shared channel depends on (is a function of) the state of the shared channel and the power received by the base station from the transmitting subscriber radios. Subscriber radio transmitting power is measured at the base station and controlled from the base station in order to impact the amount of traffic attempting to access the shared channel at any given point in time.

Mouly et al is one example of how assessing the power level of a signal transmitted by a subscriber radio can be used in performing network control functions. Mouly et al also exemplifies a system in which power level assessment overhead is expended at the base station level of a network hierarchy in order to implement the novel process described in the reference.

Other examples of how power level assessment overhead is expended to support dynamic power level adjustment techniques used in radio telecommunications networks to perform network control functions, to minimize "collisions" with respect to the use of a shared channel, etc., are described in U.S. Pat. Nos. 4,512,033 to Schrock; in 4,613,990, to Halpern; and in the aforementioned 4,550,443 to Freeburg.

Schrock describes circuitry used in a generalized bidirectional communication system, with the circuitry being resident at each of a plurality of remote terminals, for responding to externally generated power level adjustment signals. The externally generated power level adjustment signals are used to control a plurality of remote terminals connected to a master terminal.

Halpern is an example of prior art that teaches performing power level measurement at the fixed base station level of a network hierarchy to dynamically control the power of radiotelephone transmitters.

Neither the Schrock or Halpern references deal with the problem of managing and/or reducing "uplink" message traffic overhead, i.e., overhead associated with message traffic flowing from the remote terminals towards a host computer, particularly in situations where a message transmitted by a single terminal can result in a plurality of uplink messages. This phenomenon occurs whenever a transmitting terminal is within range of two or more of the plurality of base stations typically located within a given cell site.

U.S. Pat. No. 4,550,443, to Freeburg, does present a system that is capable of handling the aforementioned uplink message traffic; however, as will be explained hereinafter, the uplink traffic message overhead expended is considerable and has the potential for having an adverse affect on uplink message throughput.

The Freeburg reference (U.S. Pat. No. 4,550,443) describes a data communications system that covers a geographic area divided into a plurality of cells and includes a general communications controller (GCC), a plurality of channel communications modules (CCMs, or base stations), a set of transmitter and receiver pairs each associated with a given base station, and a plurality of portable terminals. Data signals, included in packets of information that also include control signals, are communicated between the GCC and the portable terminals by way of a radio channel (the data signals are also referred to herein as the "data portion" of a packet). Each base station takes a signal strength measurement every time it receives a packet from a portable terminal.

In systems similar to the one taught in the Freeburg references cited hereinabove, the GCC gathers the signal strength measurements from the base station receivers and all of the packets received by the various base Stations (even duplicate messages received from a given terminal) are passed to the GCC.

The GCC then computes an adjusted signal strength for each input and selects the input having the largest adjusted signal strength for determining the location of the portable radio that transmitted the packet. The GCC sends the packet associated with the strongest signal to the host, after determining that the packet contains valid data as will be explained hereinafter. Additionally, the GCC takes note of the identification (ID) of the terminal/base station pair that provided the strongest signal.

Whenever the GCC thereafter transmits a message to a portable terminal, the base station associated with the recorded terminal/base station pair ID, is the base station of choice to set up the RF link to the terminal. In other words, the base station that covers the area having the largest adjusted signal strength for the last transmission from the target portable terminal is the first choice when trying to communicate "downlink" (i.e., from the host or GCC toward the terminal).

Since the GCC can be simultaneously transmitting message signals to portable radios in other portions of the cell using non-interfering base station transmitters, downlink information throughput is greatly enhanced in systems similar to the one taught by Freeburg.

The above described Freeburg reference (U.S. Pat. No. 4,550,443) is an example of a power level adjustment technique which affects the size of the transmitting "spheres" of base station transmitters. This technique for adjusting the power level of these transmitters facilitates the ability to communicate with more than one terminal in a given cell (in a downlink sense) at any one point in time.

Although the size of the transmitting spheres can be made non-overlapping for downlink communications purposes; uplink communications in a given cell having a plurality of base stations still suffer from the aforementioned centralized overhead problems associated with two or more antennas within a cell picking up signals being transmitted by any given terminal at any point in time.

As a result, not only is equipment required at the base station level of the network hierarchy to determine signal strength for each and every message received from a terminal, the GCC in systems similar to the one described by Freeburg are also forced to expend overhead to sort out which of the received packets generated by a single terminal should be passed on to the host computer. This means that the GCC must determine which of the received packets resulted in the strongest received signal; record the ID of the base station (and the transmitting terminal) that received the signal to provide an indication of the best path to use for downlink communications back to the transmitting terminal; and determine the validity of the packets received from the various base stations before choosing a packet to send on to the host computer.

In order to determine the validity of received packets, cyclic redundancy checking (CRC) techniques, well known to those skilled in the art, are often employed at the base station level of a network hierarchy. A validity indication, like signal strength indication, is placed in the packets that are passed to the GCC which again must expend overhead in making the aforementioned packet validity determinations.

It should be noted that the strongest signal received by a base station and passed to the GCC may contain questionable data. In this case it is not desirable to pass the strongest signal on to the host computer. The GCC would typically throw out the questionable data in favor of a weaker received signal so long as the weaker signal includes a packet that passes, for example, a CRC test, or some other validity test established to verify proper data transfer within the network.

All of the presently known radio frequency data communications networks utilize a GCC or its equivalent to assure that a high quality message is passed on to the host computer, and to record downlink control information to be used in transmitting information from the host or GCC back to a specific terminal. It can be readily appreciated by those skilled in the art that where even a single message sent by a given terminal results in the GCC (1) having to interpret the signal strength of a set of received packets; and (2) having to determine the highest quality signal from among the set of packets, etc., the aforestated GCC overhead problem becomes quickly compounded when many messages are being transmitted by a given terminal, and/or messages are being simultaneously transmitted by a plurality of terminals within a given cell.

Accordingly, it would be desirable to decentralize and minimize the amount of GCC overhead expended in interpreting signal strength measurements, controlling uplink communications, and determining the quality of a set of packets received from a plurality of base stations, where the set of packets relate to the transmission of a single message by a given terminal. As indicated hereinbefore, the desirability of being able to decentralize and minimize GCC overhead for these purposes becomes even more acute in practice where multiple copies of a plurality of messages are all being input to a GCC by the base stations located in a given cell.

It would also be desirable to minimize or even eliminate the need for power level (signal strength) measurement equipment at the base station level in the network hierarchy. As indicated hereinbefore, such equipment is presently being used for the purpose of achieving reliable uplink communications and enabling the GCC to be able to select an appropriate terminal/base station pair for downlink communications.

In fact, it would be desirable to provide a radio frequency data communications network that includes methods and apparatus for determining the optimal terminal/base station pair at the terminal level of the network hierarchy based on signal strength. This is particularly true since, as those skilled in the art will readily appreciate, the terminal side of the terminal/base station link is the "weakest" link in the network hierarchy. Factors such as the terminals often being mobile (the base stations are usually fixed); terminal power supplies being typically less reliable than the power supplies used by the base stations, etc., mitigate in favor of a system in which the terminal picks the best RF link it can establish. In such a network, the terminal chosen RF link would be the link of choice passed on to the GCC for use in effecting downlink communications; rather than making the choice the other way around, i.e., at the GCC level, based on parameters that can quickly become obsolete.

Thus, it would be desirable if each terminal in the network dynamically selected a target base station and included the selected terminal/base station pair identification information within each transmitted packet. This would enable the GCC to easily identify the first choice base station to use to forward packets of data being sent from the host computer (or GCC itself) to a particular terminal, without having to expend any overhead to identify the optimal path to the terminal.

Furthermore, it would be desirable to provide a network, and related methods and apparatus, that operatively assures that only a single valid packet is sent to the GCC by only one of the base stations in a given cell, (for uplink transactions), even where a plurality of base stations each receive a packet being transmitted by a given terminal. This would significantly reduce GCC overhead since the GCC, whenever a packet is received from a base station, would simply have to store the terminal/base station ID and would then simply pass the already validated packet to the host computer.

SUMMARY OF THE INVENTION

Accordingly, it is a general object of the invention to provide a radio frequency data communications network in which (1) uplink network control functions are decentralized away from the GCC level of the network hierarchy; (2) the overhead expended in making power lever (signal strength) determinations and assessments at both the GCC and base station levels of the network hierarchy is minimized or even eliminated; and (3) individual subscriber radios dynamically determine the most desirable base station to communicate with when exchanging information with the host computer via a shared RF communication channel (the link to the base station) and the GCC.

It is a specific object of the invention to provide methods and apparatus for use in a radio frequency data communications network, where the network includes a general communications controller (a "GCC") or its equivalent; a plurality of base stations in a given cell controlled by the GCC; and at least one terminal located in or transiting through the cell, wherein the methods and apparatus minimize (or eliminate) the amount of GCC overhead expended in interpreting signal strength measurements, controlling uplink communications, and determining the quality of a set of packets received by the plurality of base stations, where the set of packets relate to the uplink transmission of a single message by a given terminal over a shared communication channel.

Furthermore, it is a specific object of the invention to provide methods and apparatus for use in a radio frequency data communications network of the type described hereinabove, to minimize or even eliminate the need for power level (signal strength) measurement equipment at the base station level in the network hierarchy.

Further yet, it is an object of the invention to provide a radio frequency data communications network that includes methods and apparatus for determining the optimal terminal/base station pair to be used in establishing RF links, at the terminal level of the network hierarchy.

Still further, it is an object of the invention to provide a radio frequency data communications network that includes methods and apparatus which enable each terminal in the network to dynamically select a target base station and include the selected terminal/base station pair identification information within each packet transmitted by a terminal. As indicated hereinbefore, such methods and apparatus would enable the GCC to easily identify the first choice base station to use to forward packets of data being sent from the host computer (or GCC itself) downlink to a particular terminal, without having to expend any overhead to identify the optimal path to the terminal.

Still another object of the invention is to provide a radio frequency data communications network, and related methods and apparatus, that operatively assures that only a single valid packet is sent to the GCC by only one of the base stations in a given cell, when the network is engaged in uplink communications.

According to one aspect of the invention a novel radio frequency data communications network is set forth for exchanging packets of digital information between a general communications controller (GCC) and at least one subscriber radio located within a predefined geographical area. The GCC may be coupled to at least one host computer (uplink from the GCC), and is coupled to a plurality of base stations (downlink from the GCC). The network performs uplink message management on a decentralized basis (decentralized with respect to the GCC) in the manner to be explained in detail hereinafter. Signal strength determination equipment at the base station level of the network is minimized or eliminated.

Each of the aforementioned packets exchanged between a subscriber radio and the GCC, is defined to include at least (1) a data portion; (2) a terminal (subscriber radio)/base station pair ID signal to identify the target base station for information transmitted uplink by a given subscriber radio, and to identify the target subscriber radio for information transmitted downlink by a given base station; and (3) information from which to ascertain the validity of data included in a packet after transmission over an RF link.

A radio frequency data communications network which may be modified, in accordance with the teachings of the invention, to realize the objectives set forth hereinbefore, comprises: (a) at least one subscriber radio located within a predefined geographical area; (b) a plurality of base stations for communicating with said at least one subscriber radio over a single RF channel which is shared by all terminals within said predetermined geographical area; and (c) general communications controller (GCC) means, coupled to said plurality of base stations, for sending packets downlink to the specific base station indicated by the terminal/base station pair ID signal contained within each packet, and for receiving packets sent uplink by any of said plurality of base stations.

According to another aspect of the invention, the GCC simply records the terminal/base station pair ID for each packet it receives from the terminal side of the network and sends at least the data portion of each packet so received to a host computer without having to interpret or determine packet signal strength or data validity information.

According to a preferred embodiment of the invention, validity checks on packets being sent uplink are performed at the base station level of the network hierarchy. The base stations resolve (among themselves) which of a set of duplicate packets to send to the GCC based on the terminal/base station pair ID contained in the packets (as the primary source for determining which base station is to forward the packet to the GCC); backed up by a predetermined priority ordering of which of the other base stations in the network is to attempt to send a valid packet to the GCC if the primary designated base station determines it has received invalid or otherwise questionable data.

The aforementioned technique for resolving which packet is to be sent, by only one of the networks plurality of base stations, to the GCC, does not depend on the strength of the signal received by any base station over an RF link to the transmitting terminal.

As will be explained hereinafter, with reference to the detailed description and the drawing, a method comprising of the steps of: (a) arranging the base stations into a local area network (LAN); (b) assigning different time delays to, for example, the base stations surrounding the primary (target) base station (where the "primary" is the target base station specified by the terminal/base station ID pair signal contained in the message being sent uplink); and (c) determining, at each of said plurality of base stations, if any of the base stations having a smaller time delay has already sent (to the GCC) a copy of the packet being sent uplink, is one way in which to relieve the GCC from having to determine and/or interpret received packet validity and signal strength data.

In fact, in accordance with the teachings of the invention, signal strength measurement at the base station level of the network hierarchy (for uplink data control purposes), can be eliminated altogether because, by definition, the contents of each packet specify the terminal/base station routing of choice.

According to still another aspect of the invention, the terminal/base station pair ID signal, for uplink communications, is dynamically determined at the terminal level of the network hierarchy. Once the pair ID is determined and later recorded by the GCC, the recorded pair ID may be used to identify the downlink terminal/base station routing of choice (until, for example, the subscriber radio moves out of range of the base station, the radio dynamically determines that another base station is a more suitable path for exchanging information with the rest of the network, etc.).

The invention also contemplates methods and apparatus for determining when to issue a retransmit request to a subscriber radio in situations where none of the plurality of base stations is able to pass valid data uplink; methods and apparatus for selecting a terminal/base station pair at the terminal level of the network hierarchy; methods and apparatus for determining, at the base station level of the network hierarchy, which of a set of duplicate packets to forward to the GCC; and other methods and apparatus which achieve the aforestated objectives.

The invention features a radio frequency data communications network, and related methods and apparatus, supporting a decentralized uplink message control function; a network that does not require signal level measurement equipment at the base station or GCC level to manage (and discriminate between) a set of duplicate messages that may be received from the transmission by a subscriber radio of even a single packet, where the radio is within range of at least two base station receivers; and a network that assigns terminal/base station pairs at the networks weakest link, i.e., the terminal side of a shared RF link with the base stations.

These and other objects and features of the invention, and the manner of obtaining them, will become apparent to those skilled in the art, and the invention itself will be best understood by reference to the following detailed description read in conjunction with the accompanying drawing.

BRIEF DESCRIPTION OF THE DRAWING

FIG. 2 depicts an example of the format of a subscriber radio initiated echo message which, in accordance with the teachings of the invention, may be used in a radio frequency data communications network to dynamically identify and select a suitable base station to communicate with from the terminal level of the network hierarchy depicted in FIG. 1.

FIG. 3 depicts an example of a base station echo message which, along with other echo messages from the base stations within range of a given terminal, may be used to determine the optimum base station for the terminal to pair up with to establish RF communications over a shared channel at a given point in time.

FIG. 4 depicts an example of a packet format that may be advantageously utilized, in accordance with the teachings of the invention, to at least assess packet validity after transmission over an RF link, and to provide information to the GCC and the base stations within range of a given terminal of the terminal/base station pair selected by the terminal.

DETAILED DESCRIPTION

Figure 1:
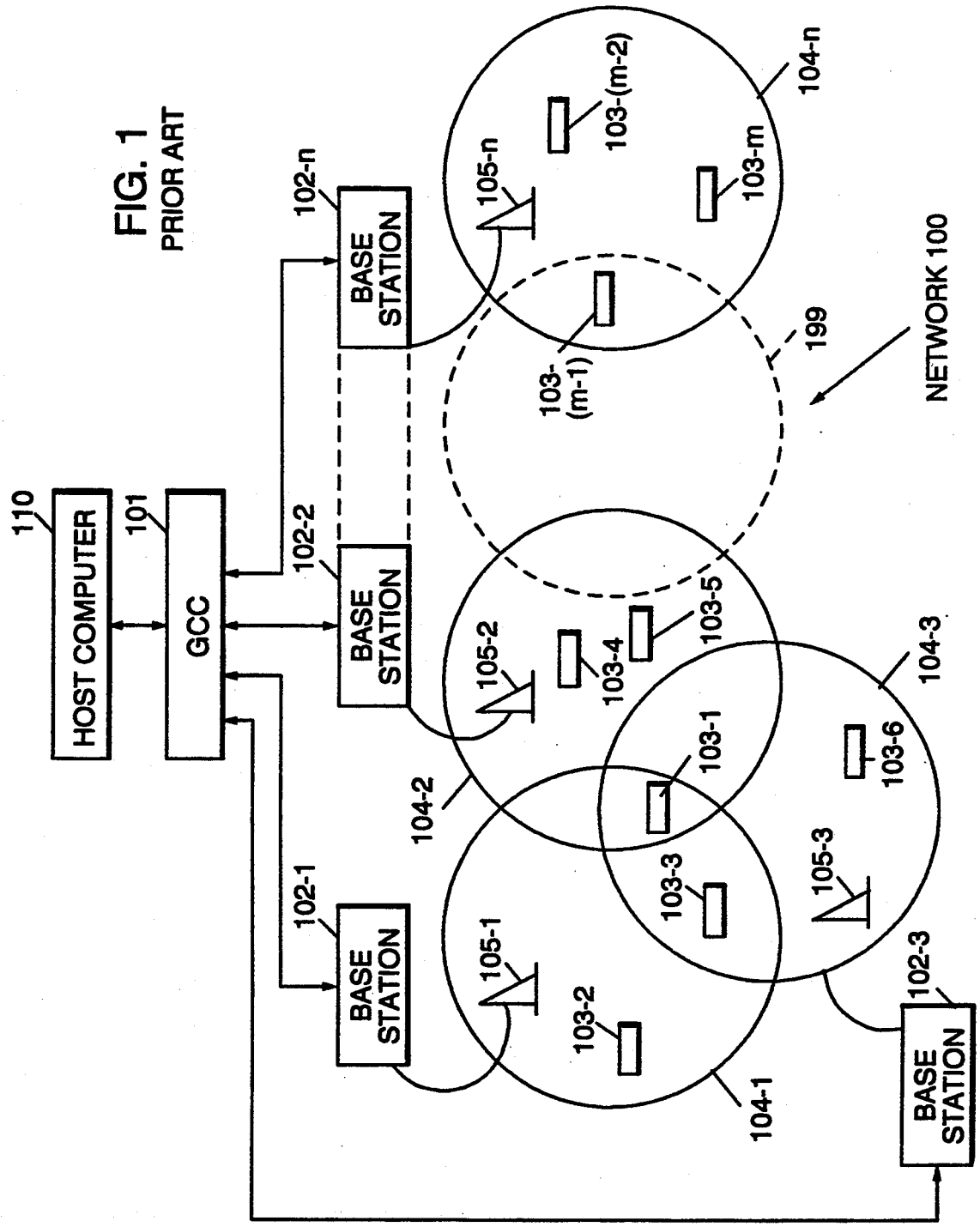
FIG. 1 depicts an exemplary radio frequency data communications network for exchanging packets of information between at least one host computer and at least one subscriber radio located within a predefined geographical area serviced by the network.

As indicated hereinabove, FIG. 1 depicts an exemplary radio frequency data communications network for exchanging signal packets between at least one host computer and at least one subscriber radio located within a predefined geographical area serviced by the network.

The network shown in FIG. 1 is similar to the one described in the aforementioned Freeburg U.S. Pat. No. 4,550,443, at least to the extent that large contiguous geographic areas can be covered with logically overlapping radio broadcast spheres (broadcast from the base station level of the network hierarchy), which may, with a high degree of probability, be dynamically optimized into non-overlapping physical spheres in order to increase network efficiency. Once again, as indicated hereinbefore, this optimization relates to the broadcast spheres established by the base station transmitters, allowing simultaneous communications to be conducted by two or more base stations in the network on a single assigned radio frequency.

As will be demonstrated hereinafter, the present invention goes beyond the type of optimization achieved by Freeburg. In particular, the present invention addresses uplink communications management problems, such as GCC level overhead, etc.(as described hereinbefore), and the decentralization of network management functions in a network in which a single preassigned RF channel carries signals transmitted by the terminals in or transiting a given cell. According to the invention, overall network efficiency is increased by the decentralization and redistribution of heretofore centralized network computer resources from the GCC level of a network hierarchy, to the network base stations and terminal nodes.

More particularly, with reference to FIG. 1, an exemplary prior art network 100, which may be modified in accordance with the teachings herein to achieve the objectives of the invention, is comprised of GCC 101, also sometimes referred to herein as (or being located at) the "GCC level" of the depicted network hierarchy; a plurality of base stations, 102-1, 102-2, 102-3, . . . , 102-n (n base stations being represented in FIG. 1), also sometimes referred to herein as the "base station level" of the depicted network hierarchy; and at least one terminal, 103-1, shown together with other terminals 103-2, 103-3, . . . , 103-m (m terminals in total being represented in FIG. 1), transiting (or permanently located within) the predefined geographic area (cell) covered by the network. The terminals comprise what is sometimes referred to herein as the "terminal level" of the network hierarchy.

The geographic area is literally "covered" by the overlapping base station broadcast spheres shown, for example, as broadcasts spheres 104-1, 104-2, 104-3, . . . , 104-n. Each "sphere" represents the broadcast range of a transmitter associated with a given base station, examples of which are designated as transmitters 105-1, 105-2, 105-3, . . . , 105-n in FIG. 1. For the sake of illustration only, it is assumed that a receiver associated with each base station is located in proximity to the aforementioned transmitters and that each receiver is capable of receiving the signals transmitted by any terminal within a depicted sphere.

The sphere shown in dashed line form in FIG. 1, sphere 199, is meant to illustrate the contiguous overlapping coverage over the predefined geographic area by the set of remaining base stations and associated transmitting and receiving antennas not specifically shown in FIG. 1.

FIG. 1 also shows host computer 110 to which network 100 may be coupled. Messages flowing "downlink" are those flowing from, for example, host computer 110 to the terminal level of the network; whereas "uplink" messages are, for example, those flowing from the terminal level of the network towards GCC 101 and/or host computer 110.

As indicated hereinbefore, the centralized GCC level of network 100 has heretofore been heavily relied upon to manage uplink communications. The techniques used required GCC computing overhead to be expended in the interpretation of signal strength measurements and validity information inserted into packets passed to GCC 101 by the plurality of base stations. Signal strength determination equipment located at the base station level is also required (by the known techniques for managing uplink communications) to measure the signal strength of duplicate packets transmitted by a single terminal within range of the receivers associated with a plurality of base stations.

According to one aspect of the invention, in order to simplify the management of uplink communications and achieve the desired decentralizing (offloading) of GCC overhead, an optimized terminal sign-on process is used which involves only the terminal signing on and the base stations within range of the effective physical broadcast sphere of the terminal. The terminal is used in the novel network to establish the optimal communication link between the terminal itself and a base station selected by the terminal.

According to a further aspect of the invention, once this link is established the terminal, when transmitting an uplink message, inserts a terminal/base station pair ID signal into the packet being transmitted. As indicated hereinbefore, the packet is defined to contain at least the data being transmitted, the aforementioned terminal/base station pair ID signal; and control information from which to determine the validity of the packet once received on the base station side of the RF link with the terminal.

According to yet another aspect of the invention, a new technique is implemented at the base station level of the network hierarchy for determining which (if any) among any two or more duplicate packets received by the base stations from a given terminal is to be passed on to GCC 101. Any packet ultimately passed to GCC 101 will contain at least a data portion and the terminal/base station pair ID signal, with the data being presumed to be valid since validity determination and interpretation will now, according to the invention, be performed at the base station level of the network.

Finally, GCC 101, according to the invention, is modified so that (for uplink control purposes) it only needs to record the terminal/base station pair ID signal from each packet received from the terminal side of the network, and passes a presumably valid packet to host computer 110.

Each of the aforementioned aspects of the invention will now be described in greater detail with reference to FIGS. 2-5.

First, the optimal terminal sign-on process contemplated by the invention, requires an echo message to be transmitted by the terminal to all base stations within range of the terminal.

An exemplary echo message packet is shown in FIG. 2, where the packet includes a signal synchronization (or start message) indication, in slot 201; and end message indicator, in slot 204; a slot for a base station ID (initially shown to contain the value "0"), slot 202; and a slot for the terminal ID number, shown recorded in slot 203 of the packet.

At the start of the sign-on process, the only information conveyed uplink by the packet shown in FIG. 2 is (a) the terminal ID number; and (b) a predefined delimiter for the sign-on (or periodic reoptimization message). According to one embodiment of the invention, the sign-on delimiter is represented by the base station ID number being set equal to "0" by the transmitting terminal.

Furthermore, according to the invention, any base station successfully receiving the echo message returns an echo packet (to the identified terminal) with its base station ID embedded in the returned packet. An exemplary return echo message packet is shown in FIG. 3. In the example, base station ID "n" is inserted in slot 301 by base station n which is identifying itself to the transmitting terminal that is trying to locate the optimal base station to communicate with.

It should be noted that the echo type messages referred to hereinabove, and shown by way of example in FIGS. 2 and 3, need pass no further uplink than the base station level of the network hierarchy. Resolving the establishment of optimized communications at the terminal and base station levels will, as indicated hereinbefore, simplify network operation and efficiency.

According to a preferred embodiment of the invention, once a terminal has dispatched an echo message (of the type depicted in FIG. 2), it goes into a listening mode for any echo message (of the type depicted in FIG. 3) returning from a base station. In addition, the terminal (according to one embodiment of the invention), also listens for echo message "crashes", based on the well known use of standard receiver field strength discrimination characteristics.

Many commercially available terminals, such as those presently in use in the ARDIS and the recently available IBM PCradio type terminals ("IBM" and "PCradio" are trademarks owned by the International Business Machines Corporation), are programmable and may be set up so that echo message received from the base stations in response to a sign-on or reoptimization procedure, message crash information, etc., may be analyzed at the terminal level of the network and stored in a terminal resident record.

In addition, such "smart" terminals may be programmed by those having ordinary skill in the art to select the base station with which the terminal desires to engage in communications with. Two examples of how to make a terminal/base station pair selection so that an active RF link can be established are set forth immediately hereinafter.

First, a given terminal may be set on and remain in an "always listening" mode, listening for a response (an echo message of the type shown in FIG. 3) to an echo message generated by the terminal. Standard radio characteristics of an FM discriminator can lock onto a signal stronger than other signals concurrently presented from other echoing base stations. From this lock onto the FIG. 3 type packet sent by the "strongest" base station transmitter, the terminal can identify the base station to pair up with.

In a second exemplary scenario, the terminal may be set on and be directly addressed (called) by a specific base station as a result of direction from host computer 110 or GCC 101. The terminal will then try to respond to that base station, and if successful the terminal/base station pairing is once again known and inserted into packets transmitted uplink by the terminal. If unsuccessful, the terminal could initiate an echo sequence to try and identify a base station to pair up with.

Once the terminal determines the optimal connection to a base station, the terminal (according to a preferred embodiment of the invention), will begin sending (or receiving) messages that include the data being exchanged. These messages may, for example, be of the format type shown in FIG. 4. According to the invention, the message packets must include at least the data being exchanged, the terminal/base station pair ID signal, and information from which to determine the validity of the packet after transmission over an RF link.

The exemplary packet shown in FIG. 4 may be advantageously utilized, in accordance with the teachings of the invention, to (1) assess packet validity after transmission over an RF link (the check sum information could, for example, be contained in slot 401 as shown in FIG. 4); (2) provide information to the GCC and the base stations within range of a given terminal of the terminal/base station pair selected by the terminal (the terminal/base station pair ID signal referred to many times herein may be sent, for example, in slots 402 and 403 of the packet shown in FIG. 4); and (3) contain (besides the data count and actual data as shown in slots 404 and 405 respectively) other information, such as an assessment of what the base station broadcast power will need to be to create an effective physical sphere of range for downlink communications (shown conveyed uplink in slot 406 of FIG. 4).

According to a novel technique performed at the base station level of the network hierarchy, to be more particularly described hereinafter, the selected base station (once it determines that it is indeed the selected base station) will forward any message it receives up the system hierarchy to GCC level, only if the message is determined by the base station to be valid.

As indicated hereinbefore, the selected base station could perform any one of many well known validity tests, such as a cyclic redundancy test, to make the required packet validity determination. Again, the check sum error information shown in slot 401 of the exemplary packet depicted in FIG. 4, may be used for validity test purposes.

Still further, the information contained in the aforementioned terminal resident record (echo analysis, message crash information, etc.), may be conveyed uplink as part of the data or in a separate slot not shown in FIG. 4. Such information may be used at the GCC or host computer level to further optimize system performance, for record keeping and performance analysis purposes, etc.

Once GCC 101 has recorded the terminal/base station pair ID information conveyed with a given valid packet to the GCC level of the network hierarchy, the GCC, according to a preferred embodiment of the invention, will dynamically maintain (with each subsequent communication iteration) the current terminal broadcast power requirement, for a given terminal/base station pair, according to the information contained in slot 406 of the exemplary packet depicted in FIG. 4.

Power requirement information will of course be subject to change if the terminal establishes itself with a different base station, if a terminal reoptimization sequence is performed, even where the same base station is selected, assuming any changes take place in radio conditions, geography, etc. The new power requirement information (when a change occurs) will, according to the invention, be passed uplink in a revised packet of the type depicted in FIG. 4, in slot 406. Utilizing this technique, base station physical broadcast spheres can be kept to a minimum, system inefficiency caused by having to manage physically overlapping broadcast spheres can be kept to a minimum, and downlink system throughput can remain optimized.

Uplink communications can be further optimized in the novel network being described herein by not only utilizing the terminals to dynamically select an optimal base station; but by eliminating the aforementioned GCC overhead presently expended whenever duplicate messages sent by the same terminal are received by a plurality of base stations, and by eliminating signal strength determination equipment at the base station level of the network hierarchy.

According to the invention, whenever a packet transmitted by a terminal is received by any base station, the base station first checks to see whether its ID (base station ID) is included in the packet. Any base station receiving the message, but not specified as the target base station in the message, temporarily stores the message at the base station level of the system hierarchy and does not pass the message to GCC 101. Hence, GCC 101 no longer receives duplicate messages from two or more base stations.

In theory, if a packet received by the target base station (i.e., the base station identified as part of the terminal/base station pair ID information contained in the received packet) has been corrupted, the target base station can "ask" the other base stations in the network if they received the message properly. The target base station would not forward the corrupted packet to GCC 101.

A key distinction between the prior art and the network contemplated by the present invention is that the base stations now resolve (among themselves) which of a set of duplicate packets to send to the GCC based on the terminal/base station pair ID contained in the packets (as the primary source for determining which base station is to forward the packet to the GCC); backed up by a predetermined priority ordering of which of the other base stations in the network is to attempt to send a valid packet to the GCC if the primary designated base station determines it has received invalid or otherwise questionable data.

If one or more base stations, other than the target base station, did receive a duplicate (but valid) packet, the target base station can "ask" some other one of the base stations send the valid received packet to GCC 101.

In practice, to implement the concepts set forth hereinabove, one embodiment of the invention which relieves GCC 101 from having to determine and/or interpret received packet validity and signal strength, contemplates (a) arranging the base stations into a local area network (LAN); (b) assigning different time delays to, for example, the base stations surrounding the target base station; and (c) determining, at each of said plurality of base stations, if any of the base stations having a smaller time delay has already sent (to GCC 101) a copy of the packet being sent uplink.

In fact, in accordance with the teachings of the invention, signal strength measurement at the base station level of the network hierarchy (for uplink data control purposes), is eliminated altogether because, by definition, the contents of each packet specify the terminal/base station routing of choice.

Figure 5:
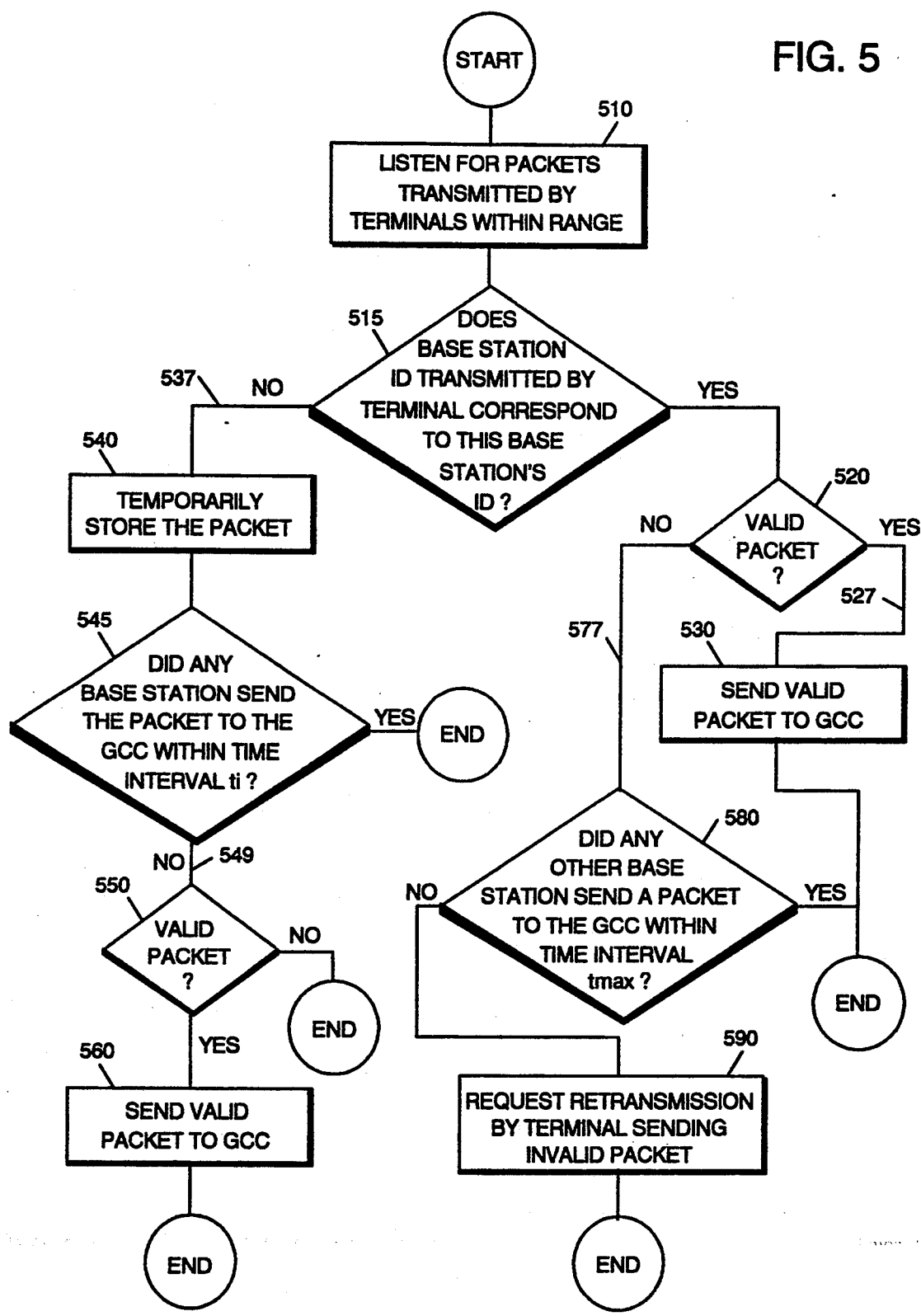
FIG. 5 depicts, in the form of a flowchart, a preferred method for practicing one aspect of the invention at the base station level of the network hierarchy, i.e. resolving which of a set of duplicate valid packets (where the method is also used to determine packet validity) is to be sent uplink to the GCC by a specific one of the plurality of base stations receiving the packets.

One embodiment of the novel technique employed at the base station level of the network hierarchy, in accordance with the teachings of the invention, may be summarized with reference to FIG. 5.

FIG. 5 depicts, in the form of a flowchart, a preferred method for resolving which of a set of duplicate valid packets (where the method is also used to determine packet validity) is to be sent uplink to GCC 101 by a specific one of a plurality of base stations receiving the duplicate packets. The flowchart functionally describes the operation of each base station, whether it is the target base station or not, where it is assumed that the base stations are able to communicate with one another using, for example only, the LAN type interconnection referred to hereinbefore.

Block 510 of FIG. 5 indicates the routine function of listening for packets transmitted by any terminal within the reception range of a given base station. Once a packet is detected, the base station must determine if the base station ID transmitted by the terminal corresponds to the receiving base station's ID. This is indicated at block 515 of FIG. 5.

In the event that the base station's actual ID and the base station ID transmitted via the terminal are the same, path 517 of FIG. 5 is taken and what now is know to be the target base station determines packet validity. This is indicated as taking place at block 520 (at the base station level of the network hierarchy; not at the GCC level).

If the packet is determined to be valid, it is then passed to GCC 101 (as indicated at block 530 along path 527), and GCC 101 will receive only the one valid packet as desired.

If it is determined at block 515 that the receiving base station is not the target base station, the embodiment of the invention depicted in FIG. 5 then temporarily stores the packet. This is indicated at block 540 down path 537, in FIG. 5.

During a predetermined time period, $t_i$, where time period $t_i$ is different for each of the plurality of base stations in the network, the non-target base station receiving the temporarily stored packet checks on the LAN to see if any other base station (the target base station or other non-target base station) has forwarded the packet from the transmitting terminal to GCC 101. This determination is indicated as being made at block 545 of FIG. 5. If this has occurred (i.e., if another base station has already forwarded the packet to GCC 101), there is nothing further for the base station, whose function is being described with reference to FIG. 5, to do with respect to the received packet.

If the packet was not forwarded to GCC 101 by another base station within time period $t_i$, then the base station, according to this illustrative embodiment of the invention, must determine the validity of its temporarily stored packet (of course this step may be performed before temporarily storing the packet without departing from the spirit or scope of the invention), as indicated at block 550 down path 549. If the packet is not valid, it is not forwarded to GCC 101, and the base station being described (a non-target base station) has nothing further to with respect to do the temporarily stored packet.

However, if the packet is determined to be valid at block 550, it is forwarded to GCC 101 (as shown at block 560), thereby providing GCC 101 with the one and only valid packet it will receive, even where duplicate packets have been received by the plurality of base stations.

Finally, with reference to FIG. 5, if the base station is the target base station as determined at block 515, and the packet is invalid, as determined at block 520, then path 577 is taken leading to block 580. In this situation the target base station also checks to see if any of the non-target base stations has sent the packet to GCC 101 within time period $t_{max}$, where $t_{max}$ is greater than any time period $t_i$ within which the non-target base stations must either succeed or fail to send a valid packet to the GCC level of the hierarchy.

If the determination at block 580 is "yes" than GCC 101 has its valid packet (and therefore also has the terminal/base station pair ID as selected by the terminal, even thought the actual routing of the packet to GCC 101 is via another base station), and the function of the target terminal with respect to the received packet is complete.

However, no base station has forwarded a packet to GCC 101 within time period $t_{max}$, as determined by the target terminal, then it can be presumed that a retransmission request for the packet needs to be issued by the target base station which, as indicated in FIG. 5, proceeds to issue such request, as shown at block 590.

The above described procedure clearly assures that GCC 101 will be passed only a single valid copy of a packet being sent uplink and clearly does not rely on (or require) any signal strength measurements being taken or analyzed at either the base station or GCC levels of the network architecture. Accordingly, the certain aspects of the aforementioned uplink message management overhead burden presently suffered by GCCs and base stations, in networks similar to the one described herein, is either eliminated or significantly reduced.

In summary, the network aspects of the invention, as described hereinabove, can be realized by modifying existing networks, of the type depicted in FIG. 1, as follows:

(1) Programming the terminals of the network to select a base station with which to establish an optimal RF link. Simply locking onto the strongest echo message from a base station within range of the terminal, for example, using AGC circuitry within a terminal, using the capture characteristics of FM signals, etc., provides a well known and suitable technique for making the terminal/base station pair selection at the terminal level of the network;

(2) Eliminating signal strength determination equipment at the base station level of the network and substituting the new technique described hereinabove for resolving which of a set of duplicate packets to send to the GCC (including determining packet validity), will assure that the GCC receives only one valid packet from the terminal side of the network and eliminate GCC overhead associated with interpreting signal strength measurements and validity information heretofore provided by the base stations; and (3) Storing, at the GCC level, only the terminal/base station pair ID signal from a packet being sent uplink, to identify the "return" path of choice, before passing what is now presumed to be valid data on to host computer 10. Of course, other packet components may be stored at the GCC level (without any analysis having to be performed with respect to uplink communications), such as downlink power level information, the terminal analysis record described hereinbefore (if passed uplink), etc.

What has been described in detail hereinabove are methods and apparatus for providing a radio frequency data communications network in which (1) uplink network control functions are decentralized away from the GCC level of the network hierarchy; (2) the overhead expended in making power level (signal strength) determinations and assessments at both the GCC and base station levels of the network hierarchy is minimized or even eliminated; and (3) individual subscriber radios (terminals) dynamically determine the most desirable base station to communicate with when exchanging information with the host computer via a shared RF communication channel (the link to the base station) and the GCC.

The network itself, structured in accordance with the teachings of the invention, and the particular techniques for network management taught herein, meet all of the aforestated objectives.

As previously indicated, those skilled in the art will recognize that the foregoing description has been presented for the sake of illustration and description only. It is not intended to be exhaustive or to limit the invention to the precise form disclosed, and obviously many modifications are possible in light of the above teaching.

The embodiments and examples set forth herein were presented in order to best explain the principles of the instant invention and its practical application to thereby enable others skilled in the art to best utilize the instant invention in various embodiments and with various modifications as are suited to the particular use contemplated.

It is intended that the scope of the instant invention be defined by the claims appended hereto.

What is claimed is:

1. A radio frequency (RF) data communications network for exchanging packets of digital information signals between a general communications controller (GCC) and at least one terminal located within a predefined geographical area, comprising:
    (a) a plurality of base stations, including a target and a non-target base station, each coupled to said GCC, for transmitting and receiving radio signals over said predefined geographical area;
    (b) a single RF channel, shared by said at least one terminal and said plurality of base stations, over which communications between said at least one terminal and said plurality of base stations may be performed;
    (c) means for dynamically selecting an optimal one of said plurality of base stations to communicate with over said RF channel, wherein said means for dynamically selecting is incorporated in each of said at least one terminal included in the network; and
    wherein a packet received by said non-target base station is forwarded to said GCC if the packet is valid and has not been forwarded to the GCC by said target base station or by any other of said plurality of base stations.

2. A radio frequency data communication network according to claim 1 wherein each of said at least one terminal further comprises:
    (a) means for transmitting a sign-on packet;
    (b) means for receiving a response to said sign-on packet form any of said plurality of base stations; and
    (c) means included in said plurality of base stations for locking onto a signal that is the strongest in a set of signals concurrently presented to said terminal by a set of base stations.

3. A radio frequency data communication network according to claim 2 wherein said sign-on packet includes a terminal ID identifying the terminal signing on.

4. A radio frequency data communication network according to claim 2 wherein each response to a transmitted sign-on packet by any of the plurality of base station includes a base station ID signal identifying the responding base station.

5. A radio frequency data communication network according to claim 1 wherein said means for dynamically selecting includes means responsive to the capture characteristics of fm radio signals concurrently presented to the terminal from base stations echoing a response to the sign-on packet transmitted by the terminal to determine which of the echoing base stations to select.

6. A radio frequency data communication network according to claim 1 further comprising means for including a terminal/base station pair ID signal in packets transmitted uplink by any terminal that has selected a base station with which to communicate.

7. A radio frequency data communication network according to claim 6 wherein packets transmitted uplink by a terminal that has selected a base station with which to communicate include at least a data portion, the terminal/base station pair ID signal indicating the target base station selected by the terminal, and information from which a given base station may ascertain the validity of a given packet after transmission over the RF channel.

8. A radio frequency data communication network according to in claim 1 further comprising means for determining, located at each of said plurality of base stations, which one, if any, of copies of a given packet received by at least two of said plurality of base stations, is to be sent uplink to said GCC.

9. A radio frequency data communication network according to claim 8 wherein said means for determining includes means for identifying which, if any, of said copies of a given packet is to be sent to the GCC based on packet content.

10. A radio frequency data communication network according to claim 9 wherein each packet transmitted by a given terminal includes a terminal/base station pair ID signal which may be used by said means for determining to identify a target base station.

11. A radio frequency data communication network according to claim 10 wherein each packet transmitted by a given terminal includes information from which said means for determining can ascertain the validity of the packet after the packet is received by a given base station on said RF channel.

12. A radio frequency data communication network according to claim 11 wherein said means for determining is operative to send said GCC any packet received by an identified target base station so long as the packet is determined, by said means for ascertaining, to contain valid information.

13. A radio frequency data communication network according to claim 12 wherein said means for determining is further operative, whenever the base station receiving a packet is not the target base station, to follow a predetermined priority ordering of non-target base stations for forwarding a received packet to the GCC.

14. A radio frequency (RF) data communications network for exchanging packets of digital information signals between a general communications controller (GCC) and at least one terminal located within a predefined geographical area, comprising:

a plurality of base stations, each coupled to said GCC, for transmitting and receiving radio signals over said predefined geographical area;

a single RF channel, shared by said at least one terminal and said plurality of base stations, over which communications between said at least one terminal and said plurality of base stations may be performed;

means for dynamically selecting an optimal one of said plurality of base stations to communicate with over said RF channel, wherein said means for dynamically selecting is incorporated in each of said at least one terminal included in the network;

means for determining, located at each of said plurality of base stations, which one, if any, of copies of a packet received by at least two of said plurality of base stations, is to be sent uplink to said GCC;

said means for determining including means for identifying which, if any, of said copies of the packet is to be sent to the GCC based on packet content;

wherein each packet transmitted by a terminal includes a terminal/base station pair ID signal which may be used by said means for determining to identify a target base station;

wherein each packet transmitted by the terminal includes information from which said means for determining can ascertain validity of the packet after the packet is received by an elected base station on said RF channel;

said means for determining being operative to send said GCC any packet received by an identified target base station so long as the packet is determined, by said means for determining, to contain valid information;

said means for determining being further operative, whenever the base station receiving the packet is not the target base station, to follow a predetermined priority ordering of non-target base stations for forwarding a received packet to the GCC; and wherein the packet received by a non-target base station is forwarded to the GCC only if the packet is valid and has not been forwarded to the GCC by the target base station or by a base station having a higher priority in said predetermined priority ordering of non-target base stations.

15. A radio frequency data communication network according to claim 14 wherein said priority ordering of non-target base stations is achieved by arranging said plurality of base stations into a local area network (LAN) with each non-target base station being assigned a different time period for monitoring the LAN as a function of its priority, to determine if the target base station or a non-target base station with a higher priority has sent a valid packet to the GCC.

16. A radio frequency data communication network according to claim 15 wherein the means for determining located at said target base station is further operative, whenever the target base station has received an invalid packet from a given terminal, to monitor said LAN to determine if any of the plurality of base stations forwards a valid copy of the packet received by the target base station, to the GCC, within a time period tmax, where tmax is at least as long as the longest time period for monitoring the LAN assigned to the set of non-target base stations.

17. A radio frequency data communication network according to claim 16 further comprising means for requesting the retransmission of a packet not forwarded to the GCC within time period tmax.

18. A radio frequency (RF) data communications network for exchanging packets of digital information signals between a general communications controller (GCC) and at least one terminal located within a predefined geographical area, comprising:

(a) a plurality of base stations, including a target and a non-target base station, each coupled to said GCC, for transmitting and receiving radio signals over said predefined geographical area;

(b) a single RF channel, shared by said at least one terminal and said plurality of base stations, over which communications between said at least one terminal and said plurality of base stations may be performed;

(c) means for determining, located at each of said plurality of base stations, which one, if any, of copies of a packet received by at least two of said plurality of base stations, is to be sent uplink to said GCC; and wherein the packet received by said non-target base station is forwarded to said GCC if the packet is valid and has not been forwarded to the GCC by said target base station or by any other of said plurality of base stations.

19. A radio frequency data communication network according to claim 18 wherein said means for determining includes means for identifying which, if any, of said copies of the packet is to be sent to the GCC based on packet content.

20. A radio frequency data communication network according to claim 18 wherein said means for determining includes means for identifying which, if any, of said copies of the packet is to be sent to the GCC independent of received packet RF signal power level.

21. A radio frequency data communications network having a hierarchical structure in which a general communications controller (GCC) performs centralized network control functions at a first network level, a plurality of base stations, coupled to said GCC, function at a second network level decentralized with respect to said first network level, and at least one terminal, capable of communicating with at least one of said plurality of base stations over a single shared RF channel, operating at a third network level which is decentralized with respect to said first and second network levels, comprising:
(a) decentralized means for managing uplink message traffic in the network, located at said second and third network levels, operative to forward only a single valid copy of a message transmitted by a given one of said at least one terminal to said first network level; and
(b) means for initializing a retransmission request from the second network level directed to said third network level if no valid message is identified at said second network level as having been forwarded to said first network level within a preselected time period, $t_{max}$.

22. A radio frequency data communication network according to claim 21 further comprising means for dynamically selecting an optimal base station in said plurality of base stations for said at least one terminal to communicate with, for both uplink and downlink message traffic, where said means for dynamically selecting is located at said third network level.

23. A method for exchanging packets of digital information signals in a radio frequency (RF) data communications network between a general communications controller (GCC) and at least one terminal located within a predefined geographical area, comprising the steps of:
(a) coupling a plurality of base stations, including a target and a non-target base station to said GCC, wherein each of said base stations is capable of transmitting and receiving radio signals over said predefined geographical area;
(b) sharing a single RF channel over which RF links between said at least one terminal and said plurality of base stations may be established;
(c) dynamically selecting a terminal/base station pair, for each active terminal, between which an RF link may be established to form an optimal communications path, wherein selection is performed locally by each active terminal; and
wherein a packet received by said non-target base station is forwarded to said GCC if the packet is valid and has not been forwarded to the GCC by said target base station or by any other of said plurality of base stations.

24. A method as set forth in claim 23 wherein said step of dynamically selecting further comprising the steps of:
(a) transmitting a sign-on packet;
(b) receiving a response to said sign-on packet from any of said plurality of base stations; and
(c) locking onto a signal that is the strongest in a set of signals concurrently presented to a given terminal by a set of base stations.

25. A method as set forth in claim 24 further comprising the step of including a terminal/base station pair ID signal in packets transmitted uplink by any terminal that has selected a base station with which to communicate.

26. A method as set forth in claim 25 further comprising the step of including, in each packet transmitted uplink by a terminal that has selected a base station with which to communicate, information from which a given base station may ascertain validity of a packet after transmission over the RF channel.

27. A method as set forth in claim 23 further comprising the step of determining, via means for determining included in each of said plurality of base stations, which one, if any, of copies of a packet received by at least two of said plurality of base stations, is to be sent uplink to said GCC.

28. A method as set forth in claim 27 wherein said step of determining further includes the step of identifying which, if any, of said copies of the packet is to be sent to the GCC based on packet content.

29. A method as set forth in claim 28 further comprising the step of including in each packet transmitted by a terminal a terminal/base station pair ID signal which may be used by said means for determining to identify a target base station.

30. A method as set forth in claim 29 further comprising the step of including in each packet transmitted by the terminal information from which said means for determining can ascertain validity of the packet after the packet is received by a given base station on said RF channel.

31. A method as set forth in claim 30 wherein said step of determining further comprises the step of sending said GCC any packet received by an identified target base station, so long as the packet is ascertained to be valid.

32. A method as set forth in claim 31 wherein said step of determining further comprises the step of following a predetermined priority ordering of non-target base stations for forwarding a received packet to the GCC whenever the base station receiving a packet is not the target base station.

33. A method for exchanging packets of digital information signals in a radio frequency (RF) data communications network between a general communications controller (GCC) and at least one terminal located within a predefined geographical area, comprising the steps of:
coupling a plurality of base stations to said GCC, wherein each of said base stations is capable of transmitting and receiving radio signals over said predefined geographical area;
sharing a single RF channel over which RF links between said at least one terminal and said plurality of base stations may be established;
dynamically selecting a terminal/base station pair, for each active terminal, between which an RF link may be established to form an optimal communications path, wherein selection is performed locally by each active terminal;

determining, via means for determining included in each of said plurality of base stations, which one, if any, of copies of a packet received by at least two of said plurality of base stations, is to be sent uplink to said GCC;

wherein said step of determining further includes the step of identifying which, if any, of said copies of the packet is to be sent to the GCC based on packet content;

including in each packet transmitted by a terminal a terminal/base station pair ID signal which may be used by said means for determining to identify a target base station;

including in each packet transmitted by the terminal information from which said means for determining can ascertain validity of the packet after the packet is received by a base station on said RF channel;

wherein said step of determining further comprises the step of sending said GCC any packet received by an identified target base station, so long as the packet is ascertained to be valid;

wherein said step of determining further comprises the step of following a predetermined priority ordering of non-target base stations for forwarding a received packet to the GCC whenever the base station receiving a packet is not the target base station; and forwarding a packet received by a non-target base station to the GCC only if the packet is valid and has not been forwarded to the GCC by the target base station or by a base station having a higher priority in said predetermined priority ordering of non-target base stations.

34. A method as set forth in claim 33 further comprising the step of establishing said priority ordering of non-target base stations by arranging said plurality of base stations into a local area network (LAN) with each non-target base station being assigned a different time period for monitoring the LAN as a function of its priority, to determine if the target base station or a non-target base station with a higher priority has sent a valid packet to the GCC.

35. A method as set forth in claim 34 wherein said step of determining, whenever said means for determining is located at said target base station and the target base station has received an invalid packet from a given terminal, further comprises the step of monitoring said LAN to determine if any of the plurality of base stations forwards a valid copy of the packet received by the target base station, to the GCC, within a time period $t_{max}$, where $t_{max}$ is at least as long as the longest time period for monitoring the LAN assigned to the set of non-target base stations.

36. A method as set forth in claim 35 further comprising the step of requesting the retransmission of a packet not forwarded to the GCC within time period $t_{max}$.

37. A method for exchanging packets of digital information signals in a radio frequency (RF) data communications network between a general communications controller (GCC) and at least one terminal located within a predefined geographical area, comprising the steps of:

(a) coupling a plurality of base stations including a target and non-target base station to said GCC, wherein each of said base stations is capable of transmitting and receiving radio signals over said predefined geographical area;

(b) sharing a single RF channel over which RF links between said at least one terminal and said plurality of base stations may be established;

(c) determining at each of said plurality of base stations, which one, if any, of copies of a packet received by at least two of said plurality of base stations, is to be sent uplink to said GCC; and wherein the packet received by said non-target base station is forwarded to said GCC if the packet is valid and has not been forwarded to the GCC by said target base station or by any other of said plurality of base stations.

38. A method as set forth in claim 37 wherein said step of determining further comprises the step of identifying which, if any, of said copies of the packet is to be sent to the GCC based on packet content.

39. A method as set forth in claim 37 wherein said step of determining further comprises the step of identifying which, if any, of said copies of said packet is to be sent to the GCC independent of received packet RF signal power level.

40. A method for determining if a particular base station, in a set of base stations including a target and a non-target base station, capable of receiving packets transmitted by at least one terminal over a shared RF channel in a radio data frequency data communications network, is to transfer a particular copy of a received packet further uplink in said network, wherein each packet transmitted uplink by said terminal includes at least the ID of a target base station, comprising the steps of:

(a) detecting the packets transmitted within the reception range of said particular base station;

(b) comparing the base station ID in any received packet received off said RF channel with the actual base station ID of the base station receiving the packet;

(c) determining, whenever the base station ID transmitted in a given packet indicates that said particular base station is a target base station, if the packet is valid based on packet content;

(d) forwarding any packet determined to be valid by a target base station uplink in said network; and wherein a packet received by said non-target base station is forwarded to said GCC if the packet is valid and has not been forwarded to the GCC by said target base station or by any other of said set of base stations.

41. A method for determining if a particular base station, in a set of base stations capable of receiving packets transmitted by at least one terminal over a shared RF channel in a radio data frequency data communications network, is to transfer a particular copy of a received packet further uplink in said network, wherein each packet transmitted uplink by said terminal includes at least the ID of a target base station, comprising the steps of:

(a) detecting the packets transmitted within the reception range of said particular base station;

(b) comparing the base station ID in any received packet received off said RF channel with the actual base station ID of the base station receiving the packet;

(c) determining, whenever the base station ID transmitted in a packet indicates that said particular base station is a target base station, if the packet is valid based on packet content;

(d) forwarding any packet determined to be valid by a target base station uplink in said network;

(e) temporarily storing the copy of a packet received by a non-target base station;

(f) determining at each non-target base station, in accordance with a predetermined priority ordering of said base stations, if any base station in said set of base stations forwarded a copy of said temporarily stored packet uplink in said network;

(g) determining, whenever the target base station and all higher priority non-target base stations fail to forward a copy of the temporarily stored packet uplink, if the temporarily stored packet is valid; and (h) forwarding said temporarily stored packet uplink if said temporarily stored packet is determined to be valid.

42. A method for determining if a particular base station, in a set of base stations capable of receiving packets transmitted by at least one terminal over a shared RF channel in a radio data frequency data communications network, is to transfer a particular copy of a received packet further uplink in said network, wherein each packet transmitted uplink by said terminal includes at least the ID of a target base station, comprising the steps of:

(a) detecting the packets transmitted within the reception range of said particular base station;

(b) comparing the base station ID in any received packet received off said RF channel with the actual base station ID of the base station receiving the packet;

(c) determining, whenever the base station ID transmitted in a packet indicates that said particular base station is a target base station, if the packet is valid based on packet content;

(d) forwarding any packet determined to be valid by a target base station uplink in said network;

(e) determining if the copy of the packet received by a non-target base station is valid;

(f) temporarily storing the copy of any valid packet received by a non-target base station;

(g) determining at each non-target base station, in accordance with a predetermined priority ordering of said base stations, if any base station in said set of base stations forwarded a copy of said temporarily stored packet uplink in said network; and (h) forwarding said temporarily stored valid packet uplink whenever the target base station and all higher priority non-target base stations fail to forward a copy of the temporarily stored packet uplink within a predetermined time period.

43. A method as set forth in claim 40 further comprising the steps of:

(a) monitoring non-target base station uplink traffic, from said target base station, to determine if any non-target base station forwarded uplink a valid copy of any invalid packet received by said target base station; and (b) requesting a retransmission of any invalid packet received by said target base station if no base station forwards a valid copy of the invalid packet uplink within a predetermined time interval, tmax.

44. A terminal for use in a radio frequency data communications network that includes a plurality of base stations, including a target and non-target base station, for dynamically selecting which of said plurality of base stations to communicate with, comprising:

(a) means for transmitting a sign-on packet;

(b) means for locking onto a signal that is the strongest in a set of signals concurrently presented to a said terminal by a set of base stations, included in said plurality of base stations, echoing a response to the transmitted sign-on packet;

(c) means for identifying the base station locked onto by said means for locking;

(d) means for including a terminal/base station pair ID signal in packets transmitted uplink by said terminal, identifying the terminal itself and the base station locked onto, once the terminal has identified the base station locked onto by said means for locking; and wherein a packet received by said non-target base station is forwarded to said GCC if the packet is valid and has not been forwarded to the GCC by said target base station or by any other of said plurality of base stations.

45. A general communications controller (GCC), suitable for use in a radio frequency data communications network that includes a plurality of base stations, including a target and a non-target base station for communicating with at least one terminal over a shared RF channel, comprising:

(a) means for managing uplink message traffic from said at least one terminal that requires only an identification of the transmitting terminal and its target base station with each valid packet passed to the GCC by any of said plurality of base stations;

(b) means for storing said identification of the transmitting terminal and its target base station as a terminal/base station pair ID for each valid packet passed to the GCC by any of said plurality of base stations;

(c) means for managing downlink data message traffic, to a particular terminal, that attempts to first communicate with said particular terminal via the base station identified as part of any previously stored terminal/base station pair ID associated with said particular terminal; and wherein a packet received by said non-target base station is forwarded to said GCC if the packet is valid and has not been forwarded to the GCC by said target base station or by any other of said plurality of base stations.

46. A base station, for use in a radio frequency data communications network that includes a set of base stations including a target and a non-target base stations, for communicating with at least one terminal over a shared RF channel, wherein packets transmitted by said at least one terminal over said channel include information identifying a target base station and further information from which to determine packet validity, comprising:

(a) means for receiving packets transmitted within the reception range of said particular base station;

(b) means for comparing the base station ID in any received packet with the actual base station ID of the base station receiving the packet;

(c) means for determining, whenever the base station ID transmitted in a packet indicates that said particular base station is a target base station, if the packet is valid based on packet content;

(d) means for forwarding any packet determined to be valid by a target base station uplink in said network; and wherein the packet received by said non-target base station is forwarded to said GCC if the packet is valid and has not been forwarded to the GCC by said target base station or by any other of said set of base stations.

47. A base station, for use in a radio frequency data communications network that includes a set of base stations for communicating with at least one terminal over a shared RF channel, wherein packets transmitted by said at least one terminal over said channel include information identifying a target base station and further information from which to determine packet validity, comprising:

(a) means for receiving packets transmitted within the reception range of said particular base station;
(b) means for comparing the base station ID in any received packet with the actual base station ID of the base station receiving the packing;
(c) means for determining, whenever the base station ID transmitted in a given packet indicates that said particular base station is a target base station, if the packet is valid based on packet content;
(d) means for forwarding any packet determined to be valid by a target base station uplink in said network;
(e) means for temporarily storing the copy of a packet received by a non-target base station;
(f) means for determining at each non-target base station, in accordance with a predetermined priority ordering of said base stations, if any base station in said set of base stations forwarded a copy of said temporarily stored packet uplink in said network;
(g) means for determining, whenever the target base station and all higher priority non-target base stations fail to forward a copy of the temporarily stored packet uplink, if the temporarily stored packet is valid; and
(h) means for forwarding said temporarily stored packet uplink if said temporarily stored packet is determined to be valid.

48. Apparatus as set forth in claim 47 further comprising:

(a) means for determining if the copy of a packet received by a non-target base station is valid;
(b) means for temporarily storing the copy of any valid packet received by a non-target base station;
(c) means for determining at each non-target base station, in accordance with a priority ordering of said base stations, if any base station in said set of base stations forwarded a copy of said temporarily stored packet uplink in said network; and
(d) means for forwarding said temporarily stored valid packet uplink whenever the target base station and all higher priority non-target base stations fail to forward a copy of the temporarily stored packet uplink within a predetermined time period.

49. Apparatus as set forth in claim 48 further comprising:

(a) means for monitoring non-target base station uplink traffic, from said target base station, to determine if any non-target base station forwarded uplink a valid copy of any invalid packet received by said target base station; and
(b) means for requesting a retransmission of any invalid packet received by said target base station if no base station forwards a valid copy of the invalid packet uplink within a predetermined time interval, $t_{max}$.

50. In a radio frequency data communications network having a hierarchical structure in which a general communications controller (GCC) performs centralized network control functions at a first network level, a plurality of base stations, coupled to said GCC, function at a second network level decentralized with respect to said first network level, and a terminal capable of communicating with at least one of said plurality of base stations over a single shared RF channel, operating at a third network level which is decentralized with respect to said first and second network levels, the network including a decentralized means for managing uplink message traffic in the network, located at said second and third network levels, operative to forward only a single valid copy of a message transmitted by said terminal to said first network level, and the network further including a means for initializing a retransmission request from the second network level directed to said third network level if no valid message is identified at said second network level as having been forwarded to said first network level within a preselected time period, $t_{max}$, said terminal comprising:

(a) transmitting means in said terminal for transmitting a sign-on packet;
(b) receiving means in said terminal for receiving a response to said sign-on packet from any of said plurality of base stations; and
(c) means in said terminal coupled to said receiving means, for locking onto a signal that is the strongest in a set of signals concurrently presented to said terminal by a subplurality of base stations included in said plurality of base stations;

said transmitting means further transmitting said message to said first network level; and said receiving means further receiving said retransmission request from said second network level and in response thereto, retransmitting said message.

51. In a radio frequency data communications network according to claim 50 wherein said sign-on packet includes a terminal ID identifying the terminal signing on.

52. In a radio frequency data communications network according to claim 50 wherein each response to a transmitted sign-on packet by any given base station includes a base station ID signal identifying the responding base station.

53. In a radio frequency data communications network according to claim 50 wherein said means for dynamically selecting includes means responsive to the capture characteristics of radio signals concurrently presented to a terminal from base stations echoing a response to a sign-on packet transmitted by the terminal to determine which of the echoing base stations to select.

54. In a radio frequency data communications network according to claim 50 further comprising means for including a terminal/base station pair ID signal in packets transmitted uplink by any terminal that has selected a base station with which to communicate.

55. In a radio frequency data communications network according to claim 54 wherein packets transmitted uplink by a terminal that has selected a base station with which to communicate include at least a data portion, the terminal/base station pair ID signal indicating the target base station selected by the terminal, and information from which a base station may ascertain validity of a packet after transmission over the RF channel.

* * * * *